(12) United States Patent
Grulick et al.

(10) Patent No.: US 6,293,081 B1
(45) Date of Patent: Sep. 25, 2001

(54) FIBER OPTIC CABLE MARKING PROCESS AND A SENSOR DEVICE USE THEREWITH

(75) Inventors: Matthew J. Grulick; Warren W. McAlpine, both of Hickory, NC (US)

(73) Assignee: Siecor Operations, LLC, Hickory, NC (US)

(*) Notice: Subject to any disclaimer, the term of this patent is extended or adjusted under 35 U.S.C. 154(b) by 0 days.

(21) Appl. No.: 09/220,121

(22) Filed: Dec. 23, 1998

Related U.S. Application Data

(63) Continuation-in-part of application No. 08/873,511, filed on Jun. 12, 1997.

(51) Int. Cl.[7] ................................................. D01H 13/26

(52) U.S. Cl. ........................... 57/293; 57/264; 174/112; 250/234; 250/557; 250/559.4; 250/559.44

(58) Field of Search ................... 57/293, 264; 174/112, 174/73.1; 385/103, 104; 226/45; 250/559.44, 559.4, 557, 234

(56) References Cited

U.S. PATENT DOCUMENTS

| | | | |
|---|---|---|---|
| 3,076,235 | 2/1963 | Rollins et al. | 18/59 |
| 3,589,118 | 6/1971 | Strelow et al. | 57/34 |
| 3,664,108 | 5/1972 | Strelow et al. | 57/34 AT |
| 3,870,410 | * 3/1975 | Abe | 353/26 |
| 3,931,513 | * 1/1976 | Germain | 250/205 |
| 4,056,343 | 11/1977 | Kaiser et al. | 425/112 |
| 4,182,239 | 1/1980 | Timmins et al. | 101/11 |
| 4,224,788 | 9/1980 | Vogelsberg | 57/294 |
| 4,266,398 | 5/1981 | Vogelsberg | 57/293 |
| 4,359,857 | 11/1982 | Oestreich | 57/18 |
| 4,383,880 | * 5/1983 | Geurtsen et al. | 156/361 |
| 4,388,496 | 6/1983 | Oestreich | 57/293 |
| 4,429,521 | 2/1984 | Oestreich | 57/294 |

(List continued on next page.)

FOREIGN PATENT DOCUMENTS

| | | | |
|---|---|---|---|
| 25 09 027 | 9/1976 | (DE) | . |
| 0 462 499 A2 | 6/1991 | (EP) | G02B/6/44 |
| 0 484 536 A1 | 11/1991 | (EP) | G01B/21/06 |
| 0 740 176 A1 | 10/1996 | (EP) | G02B/6/44 |
| 7-92360 | of 1995 | (JP) | G02B/6/44 |
| 9-129037 | of 1997 | (JP) | H01B/7/36 |
| 9-171726 | of 1997 | (JP) | H01B/13/00 |
| 10-48490 | of 1998 | (JP) | G02B/6/44 |

OTHER PUBLICATIONS

JA–63183854; Jul. 29, 1988; Patent Abstracts of Japan.
JP–A–07092360; Apr. 7, 1995; Patent Abstracts of Japan.
JP–A–09129037; May 16, 1997; Patent Abstracts of Japan.
JP–A–09171726; Jun. 30, 1997; Patent Abstracts of Japan.
JP–A–10048490; Feb. 20, 1998; Patent Abstracts of Japan.
Microscan; MS–520 Scan Head User'Manual; 1997.

*Primary Examiner*—John J. Calvert
*Assistant Examiner*—S. Hurley
(74) *Attorney, Agent, or Firm*—Timothy J. Aberle

(57) ABSTRACT

A mark sensor and methods for detecting a core mark disposed on a fiber optic cable core having a core receiving area for receiving the fiber optic cable core. The mark sensor includes emitter/receiver sensor devices that can be disposed about the core receiving area for observing a portion of the core for detecting the core mark. The mark sensor can include a sensor positioning system for moving the sensors relative to the core receiving area. The sensor positioning system is operative to move the sensors upon insertion of the cable core in the core receiving area. The sensor positioning system can include a linkage to another mark sensor for transmitting sensor motion to the other mark sensor. Alternatively, the mark sensor can include stationary sensors that sweep the core with radiation, for example, a bar code reader. Methods for using the foregoing sensors can result in the direct or offset marking of reverse oscillation of lay areas in a fiber optic cable.

27 Claims, 7 Drawing Sheets

U.S. PATENT DOCUMENTS

| | | | |
|---|---|---|---|
| 4,557,786 | * | 12/1985 | Stock et al. .................. 156/350 |
| 4,822,134 | | 4/1989 | Campbell .................. 350/96.23 |
| 4,828,352 | | 5/1989 | Kraft .................. 350/96.23 |
| 4,833,871 | | 5/1989 | Ogawa et al. .................. 57/6 |
| 4,856,266 | | 8/1989 | Ogawa et al. .................. 57/9 |
| 4,880,484 | * | 11/1989 | Obermeier at al. .................. 156/51 |
| 4,960,318 | | 10/1990 | Nilsson et al. .................. 350/96.23 |
| 4,964,691 | | 10/1990 | Nelson et al. .................. 350/96.23 |
| 4,973,238 | | 11/1990 | Kihlken et al. .................. 425/105 |
| 4,997,994 | | 3/1991 | Andrews et al. .................. 174/112 |
| 5,042,904 | | 8/1991 | Story et al. .................. 385/105 |
| 5,049,721 | | 9/1991 | Parnas et al. .................. 219/121.68 |
| 5,107,130 | * | 4/1992 | Frese .................. 250/556 |
| 5,119,464 | | 6/1992 | Freychet et al. .................. 385/147 |
| 5,130,721 | | 7/1992 | Sukhman .................. 346/1.1 |
| 5,223,852 | | 6/1993 | Oresti et al. .................. 346/1.1 |
| 5,379,363 | | 1/1995 | Bonicel et al. .................. 385/114 |
| 5,430,665 | | 7/1995 | Jin et al. .................. 364/562 |
| 5,442,187 | * | 8/1995 | Schrauwen et al. .................. 250/548 |
| 5,444,466 | | 8/1995 | Smyczek et al. .................. 347/4 |
| 5,468,914 | | 11/1995 | Falciglia et al. .................. 174/112 |
| 5,474,627 | | 12/1995 | Carriere et al. .................. 156/47 |
| 5,485,539 | | 1/1996 | Mills .................. 385/114 |
| 5,498,145 | | 3/1996 | Sikora et al. .................. 425/71 |
| 5,606,173 | * | 2/1997 | Concannon et al. .................. 250/559.3 |
| 5,635,726 | * | 6/1997 | Zavislan et al. .................. 250/559.44 |
| 5,651,082 | | 7/1997 | Eoll .................. 385/114 |
| 5,703,983 | | 12/1997 | Beasley, Jr. .................. 385/104 |
| 5,729,966 | | 3/1998 | Grulick .................. 57/293 |
| 5,745,628 | | 4/1998 | Benzel et al. .................. 385/104 |
| 5,809,194 | | 9/1998 | Lovie .................. 385/104 |
| 6,064,058 | * | 5/2000 | Wu .................. 250/226 |

* cited by examiner

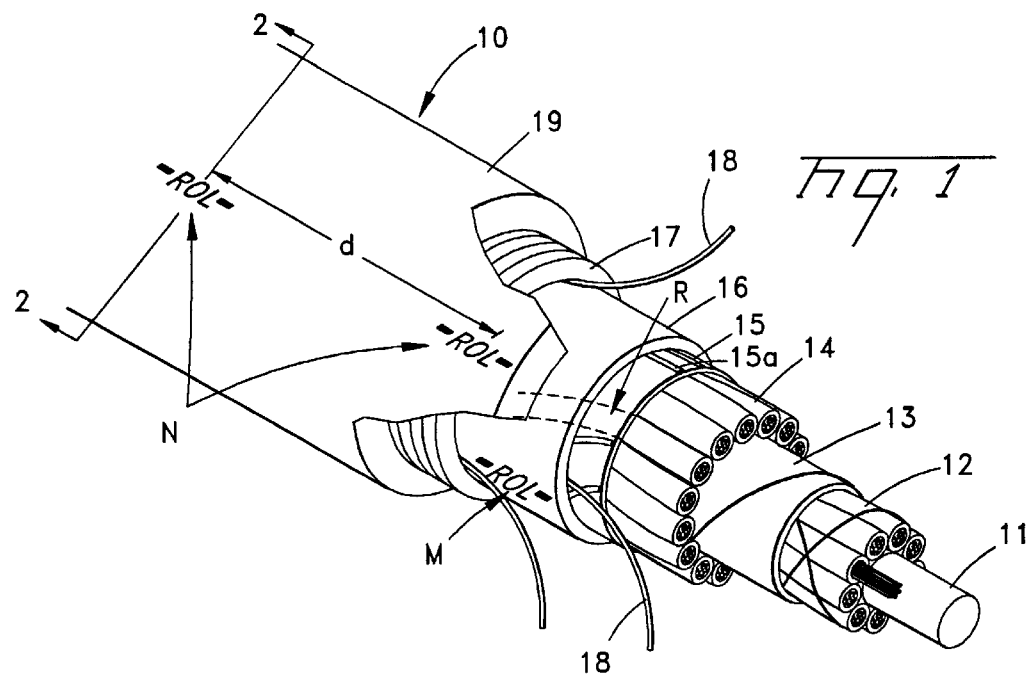
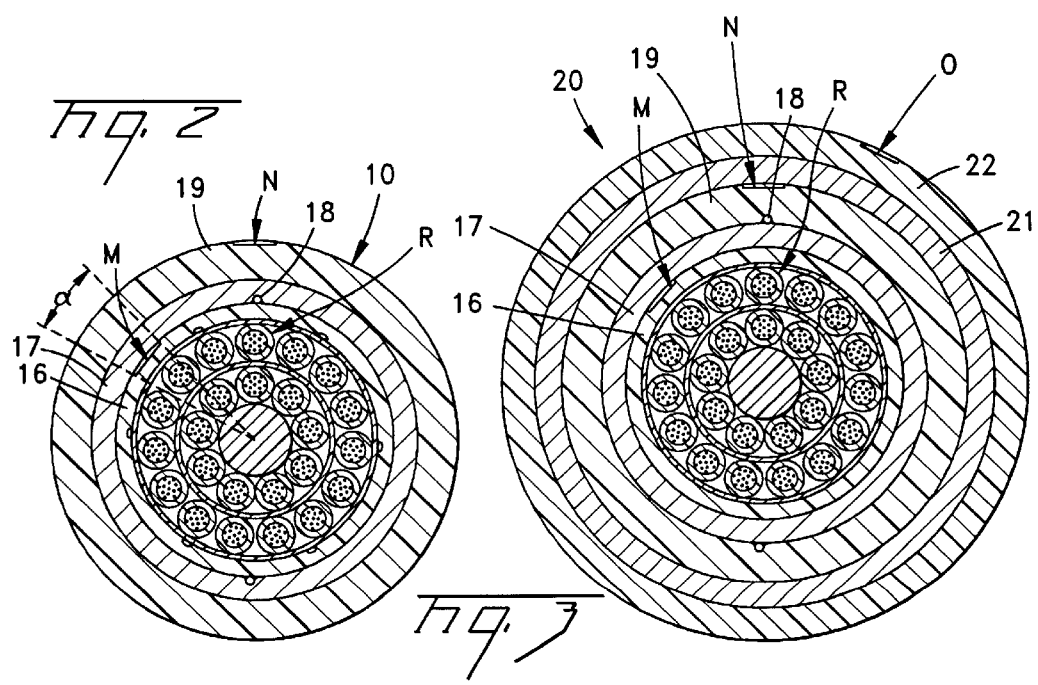

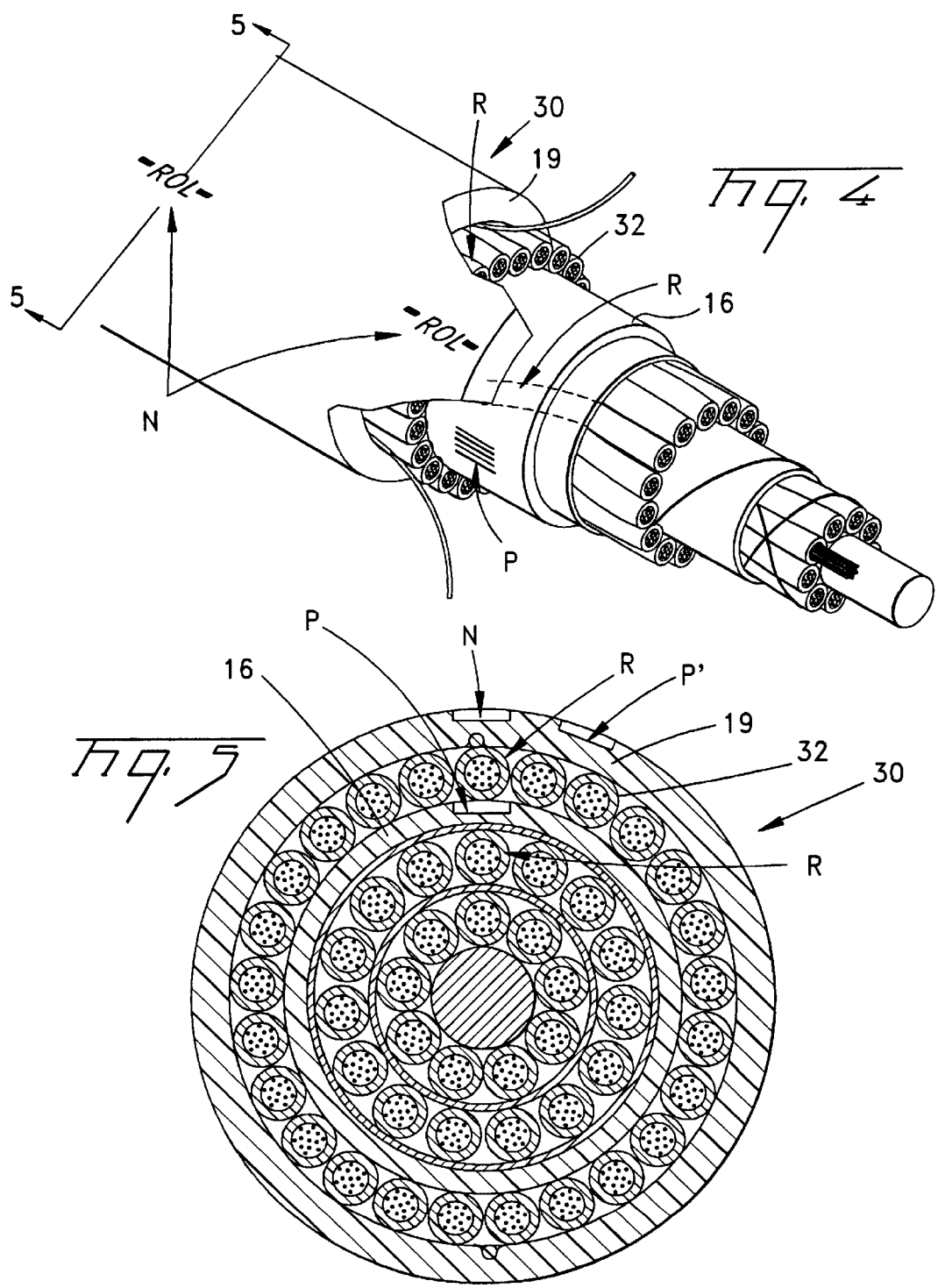

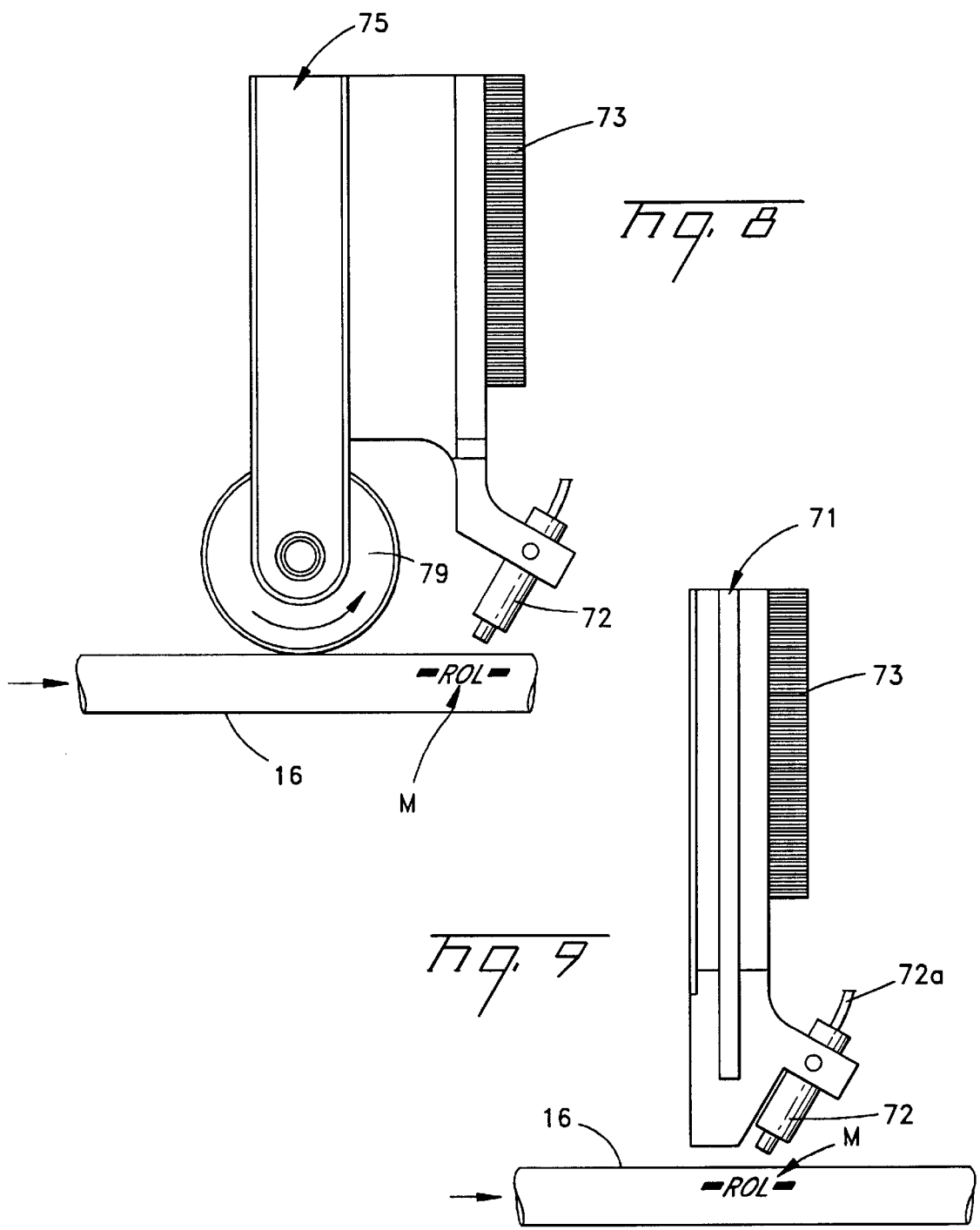

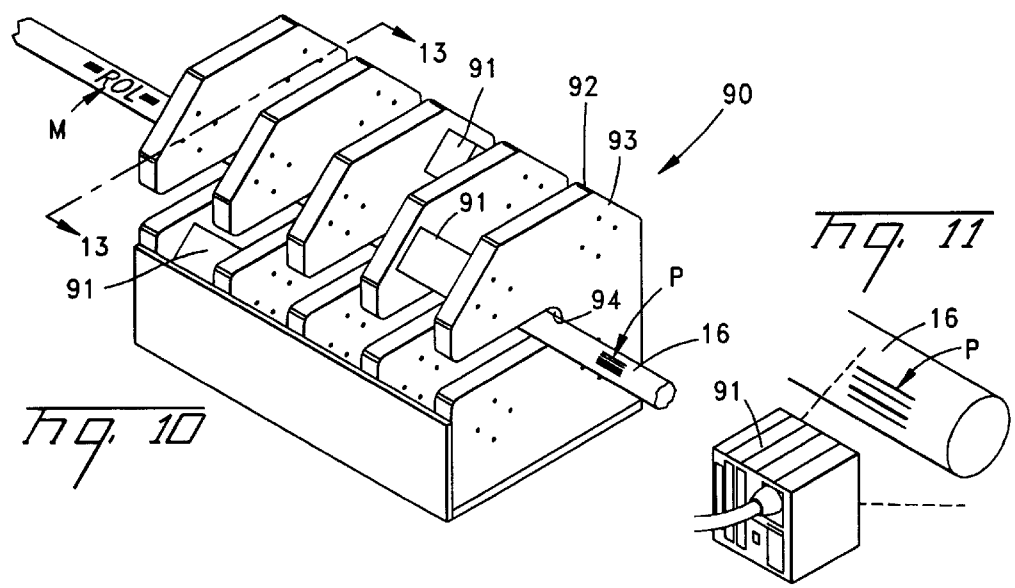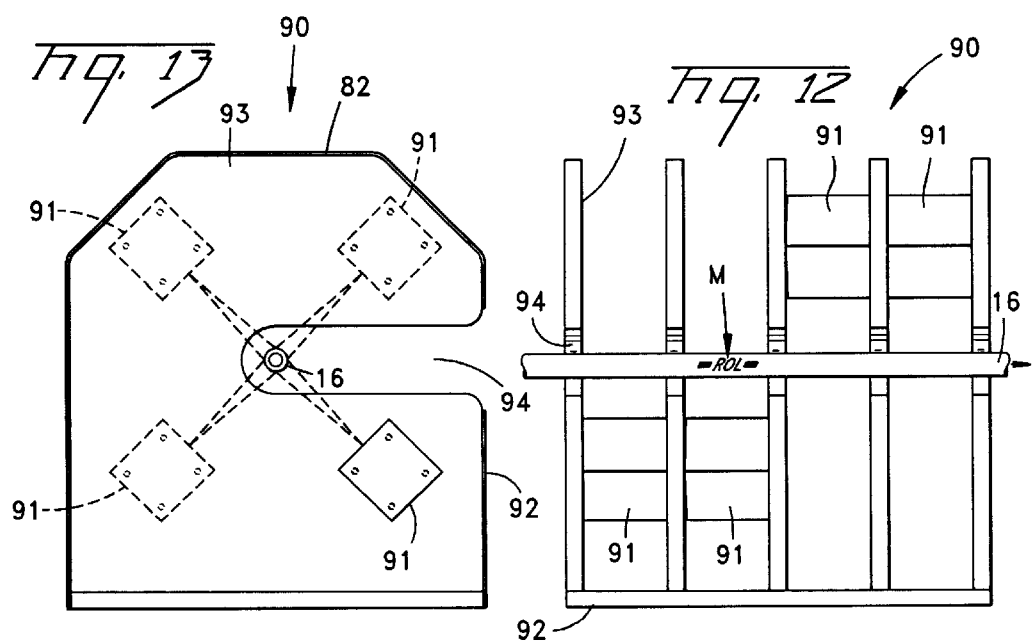

FIBER OPTIC CABLE MARKING PROCESS AND A SENSOR DEVICE USE THEREWITH

RELATED APPLICATIONS

The present invention is a Continuation-in-Part of co-pending U.S. Ser. No. 08/873,511 filed Jun. 12, 1997 the entirety of which is incorporated by reference herein.

FIELD OF THE INVENTION

The present invention relates to a manufacturing process and to an apparatus, including a mark sensor, for detecting and making an essentially permanent mark on a cable product.

BACKGROUND OF THE INVENTION

Conventional fiber optic cables comprise optical fibers which transmit information in the form of light waves. Such cables are used to transmit telephone, cable television, and data. A conventional fiber optic cable can include buffer tubes with optical fibers therein. During a cable manufacturing process, the buffer tubes may be stranded about a central member in alternating (S-Z) lay directions. More specifically, the buffer tubes are typically stranded in a first lay direction, the lay direction is then reversed, and the buffer tubes are then stranded in a second lay direction. Each location along the tubes at which the lay direction is reversed can be termed a reversal area.

Reversal area identification can assist craftsmen in fiber connection/splicing procedures. For example, in the S-Z stranded cable disclosed in U.S. Pat. No. 4,828,352, incorporated by reference herein, the buffer tube length, or tightly buffered fiber length, is advantageously longer than the length of the cable, thereby making slack available in the optical fibers at the reversal areas of the stranding. If a craftsman removes the sheath at the reversal area, the buffer tube or tightly buffered fibers there are not constrained by any unidirectional configuration. The use of a reversal mark or marks, as disclosed in U.S. Pat. No. 4,828,352, permits a craftsman to know where the excess fiber is available for ease in making fiber connections/splicing other than at the cable ends.

Automatic reversal area tracking systems have been developed for precise reversal area identification. U.S. Pat. No. 5,729,966, incorporated by reference herein, discloses a cable manufacturing process whereby reversal area marks are formed on an outer cable jacket. An optical scan detector is used to sense the location of reversal area marks made on core binders or tubes. A computer tracks the locations of the reversal areas as the cable moves along a pass-line. After extrusion of a cable jacket over the core, and when any reversal area reaches a controlled print station, the computer activates the print station and a mark is made on the cable jacket indicating the location of the reversal area.

Conventional reversal area marking techniques suggest that the marks need not be made precisely over a reversal area. For example, U.S. Pat. No. 5,809,194 discloses a cable manufacturing process for marking reversal areas or areas offset from the reversal areas. The markings are made directly on buffer tubes or a slotted core member, and are detectable by a luminescence scanner. After extrusion of the cable jacket over the tubes or slotted core, when the reversal area reaches an ink jet printer, a computer may activate the ink jet printer for marking the cable.

Camera systems requiring an interface with a memory function can be used to directly detect reversal areas. For example, U.S. Pat. No. 5,745,628 discloses a cable manufacturing process whereby marks are formed on only the outer jacket for indicating the locations of reversal areas. No marks are made within the outer jacket. Rather, a vision system includes a camera and a computer that directly views tubes and stores a threshold image of the tubes in memory and sequentially compares ongoing images of the cable core with the threshold image. When the threshold image is matched with an ongoing image, the vision system recognizes a reversal of the tubes. After extrusion of a cable jacket over the tubes or slotted core, when the reversal area reaches an ink jet printer, the computer sends a signal to the ink jet printer. The ink jet printer then marks the cable jacket.

A particular known S-Z stranded cable does not include a craft friendly mark on the cable jacket. For example, U.S. Pat. No. 5,703,983 describes marks placed between the reversal areas, but within the outer cable jacket, that indicate distances from reversal points. The marks can be made on a buffer tube core, a slotted core, a tight buffer core, a binder, a tape, or an inner jacket. The outer jacket, however, is not marked with any reversal area marking: a craftsman must therefore expend time and effort opening a window in the jacket and searching for the distance marks beneath the jacket and between reversal areas.

OBJECTS OF THE INVENTION

It is an object of the present invention to provide a mark sensor apparatus for detecting a core mark disposed over a fiber optic cable core, the mark sensor having a core receiving area for receiving the fiber optic cable core. The mark sensor apparatus can include sensors disposed about the core receiving area for observing a portion of the core and for detecting the core mark. The mark sensor apparatus can include a sensor positioning system, the sensor positioning system being operative to dynamically adjust the position of the sensor relative to the core receiving area.

It is another object of the present invention to provide a mark sensor for detecting a core mark disposed on a jacketed fiber optic cable core, comprising a core receiving area for receiving the fiber optic cable core; and at least one sensor, the at least one sensor being disposed adjacent the core receiving area for observing a surface of the jacketed core for detecting the core mark with electro-magnetic energy that sweeps across a surface of the core.

It is an object of the present invention to provide a method for manufacturing a fiber optic cable having at least one core mark disposed on a fiber optic cable core, the method comprising the step of:

(a) detecting the core mark with a mark sensor, the mark sensor being operative to observe generally the entire surface of the core as the core passes the mark sensor; and (b) tracking the core mark in a cable manufacturing line.

It is an object of the present invention to provide a method of manufacturing a fiber optic cable including the steps of:

(a) monitoring cable length information;

(b) detecting a reversal area mark on a first cable component;

(c) correlating the cable length and mark detection information;

(d) extruding a first pass jacket over the first cable component;

(e) applying a second cable component over the first pass jacket;

(f) extruding a second pass jacket over the second cable component; and (g) marking the second pass jacket with a mark in a location that is consistent with the reversal area mark for locating the reversal area.

BRIEF DESCRIPTION OF THE DRAWINGS

FIG. 1 is an isometric view of a marked cable product that can be marked according to the process and apparatus of the present invention.

FIG. 2 is a cross sectional view of the fiber optic cable of FIG. 1 taken across line 2—2.

FIG. 3 is a fiber optic cable that can be marked according to the process and apparatus of the present invention.

FIG. 4 is an isometric view of a marked cable product that can be marked according to the process and apparatus of the present invention.

FIG. 5 is a cross sectional view of the fiber optic cable of FIG. 4 taken across line 5—5.

FIG. 8 is a side view of a sensor unit for use with the sensor apparatus of FIG. 7.

FIG. 9 is a side view of a sensor unit for use with the sensor apparatus of FIG. 7.

FIG. 10 is an isometric view of a sensor apparatus that can be used in the cable manufacturing line of FIG. 6.

FIG. 11 is a schematic view of a sensor unit of FIG. 10 scanning the surface of a fiber optic cable of the present invention.

FIG. 12 is a side view of the sensor apparatus of FIG. 10.

FIG. 13 is a cross sectional view of the sensor of FIG. 10 taken at line 13—13.

DETAILED DESCRIPTION OF THE INVENTION

Figure 6:
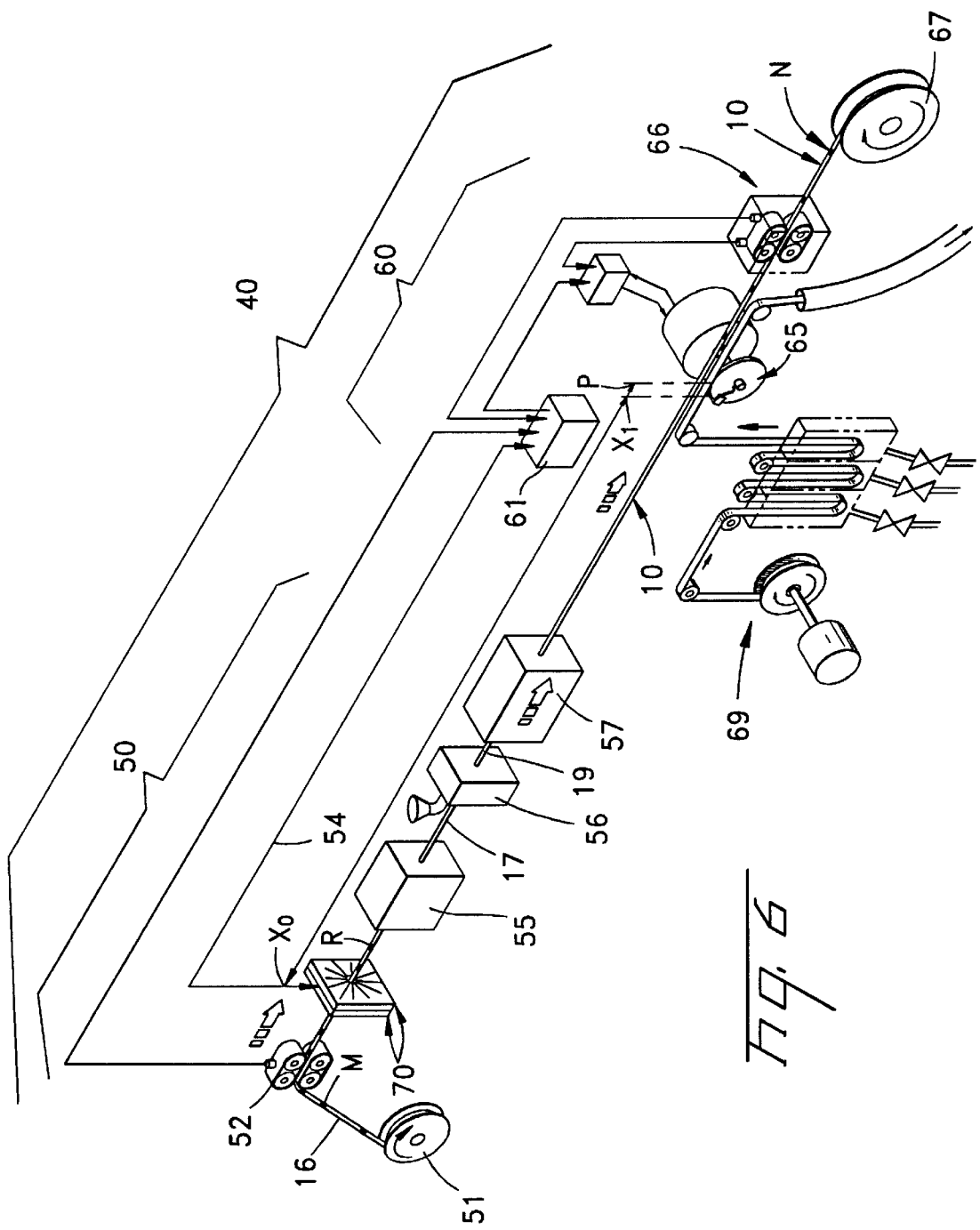
FIG. 6 is a schematic view of a cable manufacturing line according to the present invention.

With reference to FIGS. 1–5, exemplary fiber optic cables 10,20,30 of the present invention will be described. Fiber optic cable 10 (FIG. 1) includes a core that can have several cable components. For example, the core can include a central member 11, and a group of buffer tubes 12 having one or more single mode, multi-mode, or multi-core optical fibers in, for example, ribbon or bundle form. The core can also include a water swellable tape 13, a second group of buffer tubes 14, a water swellable tape 15 bound by strength filaments 15a (e.g. aramid yarns), and a first pass jacket 16. One or more cable components, for example, an armor tape 17 can be disposed in an annulus between jacket 16 and a second pass jacket 19. One or more ripcords 18 can be provided for facilitating removal of armor tape 17 and jackets 16,19. Armor tape 17 can be a metallic armor or a high strength polymeric armor material. Jackets 16,19 can be formed of, for example, polyethylene, polyvinyl chloride, or a fluoro-compound.

Buffer tubes 14 are stranded such that they have reversal areas R. A process as disclosed in U.S. Pat. No. 5,729,966, incorporated by reference hereinabove, can be used to place a core mark M on a cable component, for example, jacket 16. A manufacturing process according to the present invention can place a mark N on outer jacket 19 generally consistent with the axial location of jacketed core mark M. Mark N can, by convention, be placed at a position that is axially or angularly offset from mark M and the reversal area R can nevertheless be found by a craftsman, for example, during a mid-span access procedure. Reversal areas R can be typically axially spaced apart at lay lengths d in the range of about 200 to 2500 mm.

Fiber optic cables of the present invention may include additional layers and marks, for example, as embodied in fiber optic cable 20 having jackets 16,19,22 with respective marks M, N, O (FIG. 3). Mark O is made on cable jacket 22 that surrounds one or more cable components, for example, an armor layer 21.

Marks M,N,O preferably do not encircle the cable core. For example, marks M,N,O can be an exemplary mark including two machine readable bars/stripes with the characters ROL interposed therebetween. This arrangement is advantageous first because the craftsman can read a mark M,N,O and recognize it as indicating a reversal area, and second because the sensors of the present invention, described below, will be capable of reliably recognizing the bars/stripes. As described in more detail hereinbelow, marks M,N,O can include one or more marks or symbols, e.g., a bar, stripe, bar code, alpha/numeric character, and/or tradename or trademark. Marks M,N,O, when in the form of a bar code, for example, in addition to the reverse oscillation of lay marking function, can also perform an additional function of conveying product information, customer installation information, specifications, quality data, batch number, etc. to a digital bar code reading device. For example, the present invention can be practiced in the form of a fiber optic cable 30 (FIGS. 4–5) that is marked or labeled with one or more digital codes, for example, a bar code P. Various cable components 32 can be disposed in an annulus between marks N and P. Mark N can indicate the location of a reversal area of tubes 32, and a mark P' can indicate the location of mark P. Bar code P can include bars/stripes of any color in contrast to the color, typically black, of jacket 16 or other background. Bar code P can be, for example, indent printed, inked on the jacket, or applied as an (adhesive backed or heat fused) bar code label. Marks M,N,O,P can have corresponding locations placed generally or precisely at or offset from reversal areas R for performing the reverse oscillation of lay marking function.

Manufacture

Fiber optic cables according to the present invention can be manufactured by a manufacturing apparatus 40 (FIG. 6) and methods of the present invention. Apparatus 40 can include, for example, a jacketing section 50 and an operation section 60. Jacketing section 50 can, for example, apply a second pass jacket 19 to jacket 16 of fiber optic cables 10,30 (FIGS. 1 and 5), and/or it can apply a third pass jacket 22 over second pass jacket 19 of fiber optic cable 20 (FIG. 3). Operation section 60 is operative to mark reversal areas R on cable jackets 19,22 with a marking device, for example, a print head 65 as disclosed in U.S. Ser. No. 08/873,511 incorporated by reference hereinabove. Print head 65 is operatively associated with a programmable logic controller (PLC) 61.

The Apparatus

With reference to FIGS. 6–13, jacketing section 50 will be more fully described. In an embodiment of the present invention, jacketing section 50 can, for example, perform mark detection, armoring, and jacketing functions on the core. More specifically, jacketing section 50 can include a payoff reel 51, a length counter 52, and a sensing function having one or more mark sensors 70 (FIGS. 6–9) or a mark sensor 90 (FIGS. 10–13). Jacketing section 50 can also include, for example, a conventional armor tape applicator 55, a cross-head extruder 56, and a cooling trough 57. The armor tape methods disclosed in U.S. Pat. Nos. 4,487,641, 4,518,034, 4,647,720, 5,018,268, 5,076,872, and 5,410,901 are incorporated by reference herein.

Mark sensors 70,90 of the present invention can include radiation devices, for example, of the emitter/receiver type. The radiation devices can operate by radiating electromagnetic energy, for example, light that is reflected off of a surface of the cable core and is received by one or more receivers. Mark sensor 70 (FIGS. 6–13) includes a frame 77 with one or more sensor units 71,75 (FIGS. 7–9) adjacent a core receiving area 78. Frame 77 can include one or more dynamic sensor positioning systems 80 including: racks 73 on each side of sensor units 71,75; rotatably mounted intermeshing cogwheels 74a, 74b; linkages 81; and springs 82. Sensor units 71,75 are concentrically mounted about core receiving area 78 and are operatively connected to each other by racks 73 and cogwheels 74a, 74b. Sensor units 75 (FIG. 9) can include respective wheels mounted thereon for sensor position adjustment and rotation upon engagement with the jacketed core to be marked. Sensor units 71,75 are moveable in channels 76 upon activation of sensor positioning systems 80.

As noted above, sensor units 71, 75 include respective radiation devices. The radiation devices can be, for example, optical emitter/receiver sensors 72 such as marketed by Omron Electronics that can be operatively associated with an interface circuit (not shown). The interface circuit can have respective opto-electronic amplifiers for converting and amplifying the signal from the respective optical receivers in sensors 72 and sending the signal to PLC 61 in an electronic signal mode. The opto-electronic amplifiers are tuned or programmed so that a signal characteristic representing light reflected off an unmarked core surface can be transmitted to PLC 61. A contrasting signal characteristic of light corresponding to light reflected from the reverse oscillation of lay marks M,N is also tuned or programmed into the opto-electronic amplifiers. PLC 61 is operative to distinguish between the characteristic signals and recognize a mark.

Figure 7:
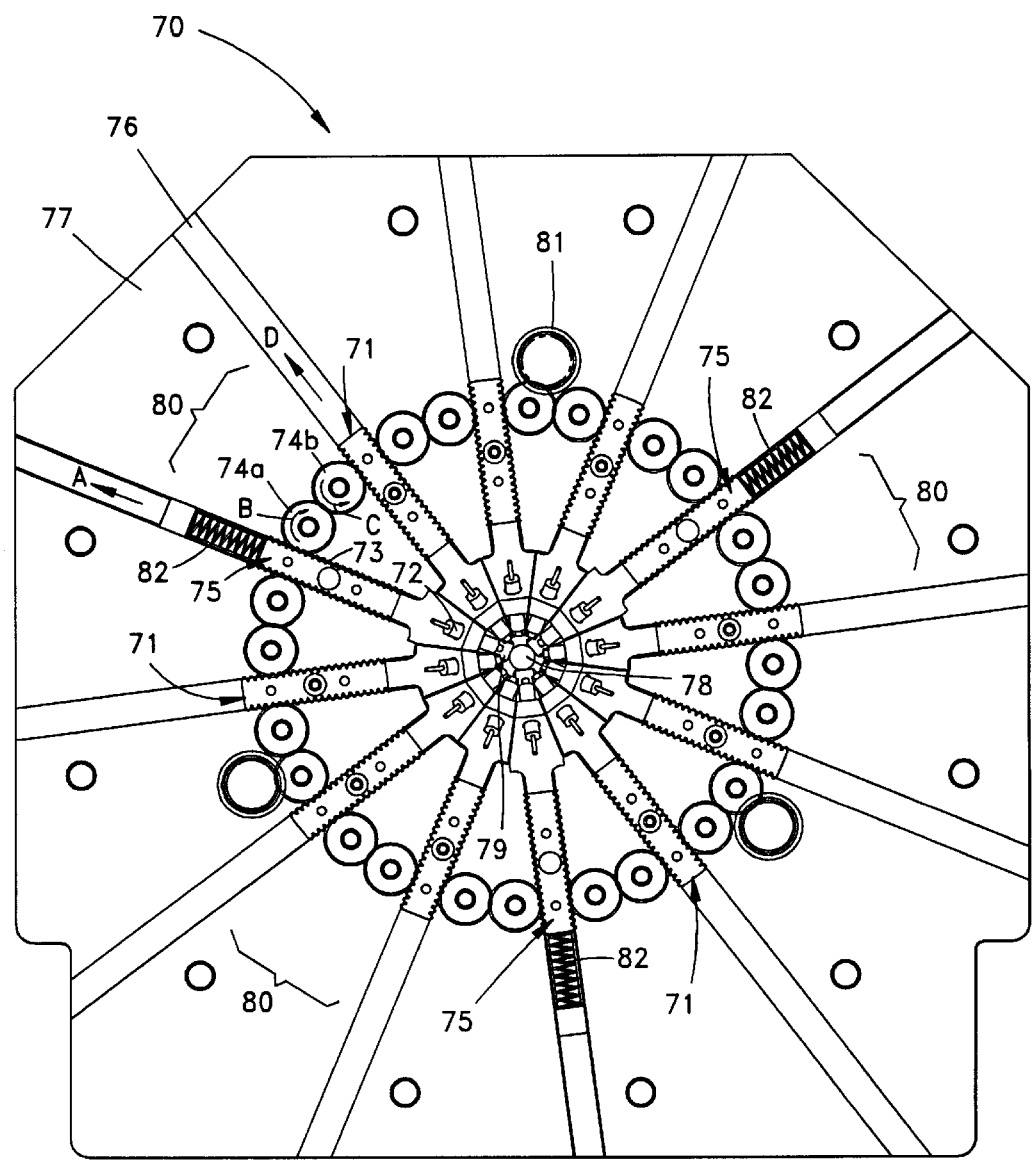
FIG. 7 is a view of a sensor apparatus that can be used in the cable manufacturing line of FIG. 6.

The number of sensors can depend on the range of cable sizes to be manufactured. For example, for a cable diameter range of about 10 mm to 25 mm, sensor 70 can require twenty-four emitter/receiver sensors 72 angularly spaced about cable receiving area 78. Two mark sensors 70 (FIG. 6) having twelve sensors 72 each may be required so that the sensors can be offset at angular intervals of, for example, about 15°. The positioning systems 80 of two mark sensors 70 can be mechanically interlocked by linkages 81 (FIG. 7). Linkages 81 are operative to transmit motion from the respective positioning systems 80 of one mark sensor 70 to a second mark sensor 70. The second mark sensor 70 can be identical to the first mark sensor or it need only have sensor units 71.

Alternatively, marks M,N can be detected by mark sensor 90 (FIGS. 10–13). Mark sensor 90 (FIG. 10) can include a frame 92 having at least one radiation device mounted thereto. The radiation device can be a sensor unit 91 that is operative to scan the surface of the core by emitting electromagnetic energy in the form of a laser beam, and reading reflected light with a receiver/reader. For example, sensor 91 can be a conventional Microscan® bar code reader that actively sweeps across the field of detection, i.e., the surface of the jacketed core. (FIG. 11). The receiver can detect changes in contrast in the reflected light, for example, light reflected from white bars/stripes (indicating marks M or N) that have been applied to a black cable jacket 16. The output of sensor 91 can be operatively associated with an interface circuit that amplifies the output signal so that it is compatible with PLC 61. The sensing range of sensor 91, defined between the emitter and the pass line, preferably does not have to be adjusted for a wide range of cable sizes. Sensor 91 can include one or more light filters (not shown) for attenuating the light reflected off the surface of the jacketed core and filtering out small variations in contrast due, for example, to variations in the reflectance of jacket 16.

Frame 92 can include a series of sensors 91 mounted to respective supports, for example, panels 93 (FIGS. 10, 12 and 13) that can be of a black color for reducing reflected laser light. Each panel 93 can include a respective aperture 94 defining a core receiving area (FIGS. 10 and 12–13). Sensors 91 can be mounted on panels 92, for example, at about 90° intervals (FIG. 13) so that the laser of each sensor 91 can sweep over a portion of the jacketed core. A portion of the laser light will reflect off mark M which is preferably a contrasting color with respect to the black color of cable jacket 16. PLC 61 can include a program whereby if one of sensors 91 detects a mark, other sensors 91 are switched off until a sufficient length of cable has passed through the mark sensor. A cover (not shown) can be placed over supports 92 for preventing laser flash burns in an operator's eyes.

As noted above, marks M,N,O can be one or more marks or symbols, e.g., a bar, stripe, bar code, alpha/numeric character, or trademark. Marks M,N,O,P can be placed at any location for indicating a reverse oscillation of lay area R, for example, generally at, near, or offset/medially between reversal areas R. Marks M,N,O,P need only cover a small surface area, for example, spanning preferably about less than 180° of arc or less, more preferably about 30° or less, as exemplified by angle alpha, (FIG. 2). Bar code P can also perform the function of conveying product information, customer specifications, quality data, batch number, etc.

Operation Section 60

As noted above with reference to FIG. 6, operation section 60 includes PLC 61. Operation section 60 can also include a print head 65, a sensor function 66, and a marking material accumulator system 69, all as described in U.S. Ser. No. 08/873,511, incorporated by reference hereinabove. However, accumulator system 69 can comprise a generally horizontal chamber for feeding a marking tape to the print head 65. In addition, print head 65 is preferably an indent printer adapted to apply marks N,O,P essentially permanently as needed. As noted above, marks N,O can include, for example, bars or stripes adjacent an ROL symbol so that sensors 70,90 can read the marks and a craftsman will understand that a reversal area is being indicated. Mark M can be applied to jacket 16 a first pass jacketing operation, as described in U.S. Pat. No. 5,729,966 incorporated by reference hereinabove.

Operation

With reference to the foregoing, exemplary marking methods of the present invention will be described in the context of, for example, a second pass jacketing operation. For illustrative purposes, the exemplary marking methods will make reference to the manufacture of fiber optic cable 10. Skilled artisans will appreciate, however, that one or more of the present inventive concepts can be employed to manufacture a variety of fiber optic cables within the scope of the appended claims.

During the second pass procedure as performed by jacketing section 50, the position of core mark M may not be practical to manipulate, i.e., the mark can appear at virtually any angular position 360° on the surface of the jacketed core. It may therefore be necessary to detect core marks M over the entire surface of the jacketed core. Mark sensors 70,90 of the present invention can reliably accomplish the task of detecting core marks M at any position along the core.

In operation, mark sensor 70 initially receives a fiber optic cable core through cable receiving area 78 (FIG. 7) causing sensor units 75 to be moved from an initial state. When the cable core is inserted, sensor positioning system 80 is activated as wheels 79 rotatably engage the outer surface of the jacketed core, for example, jacket 16 (FIG. 8) and axially locate the core. Wheels 79 are sized so that when they rest on the core the proper distance is set from sensors 72 to the surface of the jacket so that the core marks will be within the detection range of sensors 72.

Initial activation of positioning systems 80 by the engagement of wheels 79 with the core causes motion in certain parts of mark sensor 70. More specifically, guided by channels 76, sensor units 75 are moved away from cable receiving area 78 in the direction of arrow A (FIG. 7) and against the biasing forces of springs 82. As this occurs, the movement of racks 73 causes cogwheels 74a to rotate in the direction of arrow B thereby causing cogwheels 74b to rotate in the direction of arrow C. At the same time, the rotation of cogwheel 74b causes the rack of an adjacent sensor unit 71 to move in the direction of arrow D. The motion of a sensor unit 75, as it is pushed by an inserted core, is transmitted to adjacent sensor units 71 so that sensor units 71,75 move generally in unison.

In other words, sensor units 71,75 are dynamically positionable relative to the core so that sensors 72 can detect marks on the surface of the core. In addition, sensor positioning systems 80 assure that cores of a predetermined size range can be used with mark sensor 70. Moreover, as the core translates through sensor 70 positioning systems 80 will automatically adjust to variations in core size. When the cable core is removed from sensor 70, the biasing forces of springs 82 pressing on sensor units 75 will reverse positioning systems 80 so that sensor units 71,75 will be re-positioned to the initial state. Abutting sides of sensor units 71,75 can define a keystone-like configuration which maintains the position of the sensor units in the initial state.

On the other hand, mark sensor 90 need not have dynamic parts (FIGS. 10–13). The core is initially pulled through apertures 94 and, as the core translates, the lasers of sensor units 91 sweep the core surface seeking marks in contrast to the color of jacket 16. If one sensor unit 91 detects a mark, PLC 61 can switch off the other sensor units until a sufficient length of cable has passed through the mark sensor. Marks M are preferably at a 90° turn relative to the sweeping direction of the beams emitted by sensor units 91. The use of four sensors spaced at 90° intervals (FIG. 13) assures that the surface of the core will be completely scanned.

As the core moves through jacketing section 50 mark sensor 70 (or 90) will detect core mark M and via lead 54 send an appropriate signal to PLC 61 and PLC 61 will send a print signal to print head 65. PLC 61 tracks the location of mark M (and reversal areas R) through manufacturing apparatus 40, as described in U.S. Pat. No. 5,729,966 and in U.S. Ser. No. 08/873,511 both of which are incorporated by reference hereinabove. After the mark is detected by sensor 70 at point $X_0$, the cable core can have a component, for example armor tape 17, applied over it at armoring station 55. Next, jacket 19 is applied over tape 17 by extruder 56 which is cooled in cooling trough 57. When the core mark reaches point $X_1$, PLC 61 will send an initiate print command whereby print head 65 will be accelerated to reach point P at the same time the core mark does. Print head 65 will then make essentially permanent marks N at the desired location on cable jacket 19.

As noted above, any mark N can be made at any consistent location on cable jacket 19 for locating reversal area R, for example, generally at, or offset from, any reversal area R. This can be done by logic programmed in PLC 61, and with or without accounting for strain acting on the cable during the manufacturing process. With respect to strain compensation, where the cable manufacturing line is not long and/or there are no significant changes in tension or strain in line operations, strain may not be a significant factor, in which case PLC 61 would not employ the strain compensating program and length counter 66 would not be necessary. Alternatively, where the manufacturing line is long and/or changes in tension and strain occur in the line operations, strain acting on the core can be significant and length counter 66 can be used to provide data to PLC 61 in the execution of the strain compensating function. In either event, PLC 61 is operative to control print head 65 so that marks are made at consistent locations at or, by convention, offset from reversal areas.

Figure 14:
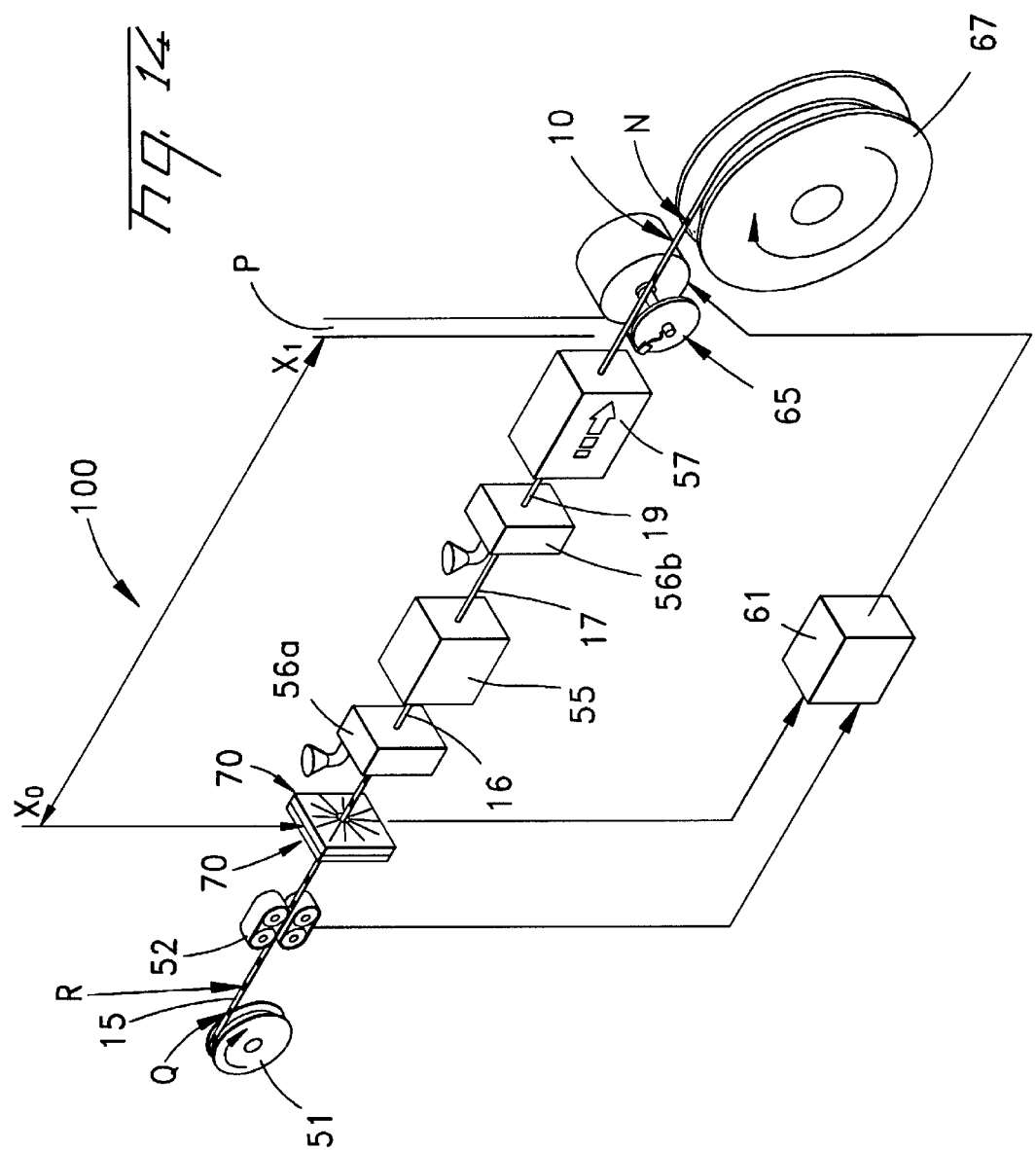
FIG. 14 is an isometric view of a cable manufacturing line according to the present invention.

With further reference to the foregoing, fiber optic cables 10,20,30 can be made in an alternative manufacturing apparatus 100 (FIG. 14). Operation of apparatus 100 effectuates a second pass jacketing procedure and will be described, for illustrative purposes, with reference to the manufacture of fiber optic cable 10. Skilled artisans will appreciate, however, that the inventive concepts can be used to manufacture other fiber optic cables as well. A core including a tape 15 as an outer layer of the core includes marks Q generally indicating reversal areas R as described in U.S. Pat. No. 5,729,966, incorporated by reference hereinabove. As the core advances in the line from pay off reel 51, length counter 52 indicates the core length to PLC 61, and mark sensors, for example, mark sensors 70 (or 90), detect marks Q at point $X_0$. The core mark information is provided to PLC 61 which correlates the mark and length information as described hereinabove and in U.S. Pat. No. 5,729,966 and U.S. Ser. No. 08/873,511. Next, extruder 56a applies a first pass jacket 16 over the core. A cable component, for example an armor tape 17, is applied over jacket 16 by an armor tape applicator 55. Outer jacket 18 is applied over tape 17 at a second extruder 56b and then the cable is cooled in cooling trough 57. As described hereinabove and in U.S. Pat. No. 5,729,966, and in U.S. Ser. No. 08/873,511, PLC 61 will activate print head 65 at point $X_1$ so that reversal areas R will be marked at point P with marks N on jacket 19. Fiber optic cable 10 is then taken up on take up reel 67. Apparatus 100 can include a print head or other jacket marking apparatus between extruders 56a,56b for marking first pass jacket 16 prior to extrusion of the second pass jacket.

In the field, a craftsman will be able to locate marks M,N,O,P and/or P', and cut jacket 16,19 and/or 22 for exposing a reversal area R, or by convention, a portion of the cable offset from the reversal area. In either event, access to any of reversal areas R advantageously facilitates a craftsman's mid-span access to optional fibers for splicing or connectorization.

The present invention has thus been described with reference to the foregoing embodiments, which embodiments are intended to be illustrative rather than limiting. Skilled artisans will appreciate that variations and modifications of said embodiments may be made without departing from the scope of the appended claims.

For example, positioning systems 80 can include one or more electrical/electronic components, e.g., proximity sensors operatively associated with servo-motors for moving one or more of the sensor units as described above. The proximity sensors would detect a cable inserted in cable receiving area 78 and could interface with PLC 61 so that the PLC would send a signal to the servo-motors to retract the sensors to a predefined position. Once the cable was removed from mark sensor 70, the proximity sensors would indicate the same to PLC 61 so that the sensor units would be returned to the initial position. Positioning system 80 may include other mechanical parts disposed concentrically about the cable receiving areas described above, or combinations thereof, known to skilled artisans as being capable of performing like functions, for example: cams, cam followers, links, bar linkages, eccentric wheels, cranks, connecting rods, cylinders, pistons, gears, screws, electric devices/motors, hydraulic or pneumatic components, plungers, actuators, or robotic components.

In addition, other types of sensor units may be used, for example, an electronic camera system as disclosed in U.S. Pat. No. 5,745,628, incorporated by reference herein, or an inductive proximity sensor can be used as disclosed in U.S. Pat. No. 5,729,966. Fewer sensors can be used to view the core surface having a wide field of detection. Sensor 70 can include one or more sensors 91, and sensor 90 can include one or more sensors 72. Where it is practical to manipulate the angular positions of the core marks, less than 360° coverage of the core by the sensors may be employed. Mark sensors 70,90 can be used to detect marks on virtually any cable component in optical fiber manufacturing, cable manufacturing, or cable installation environments. Mark sensors 70,90 can read bar codes on optical ribbons, or buffer or core tubes. Mark sensors 70,90 can be used in any cable manufacturing operation, e.g. re-spooling, or a cable installation procedure, e.g. a length or an ROL mark counting or bar code reading procedure. Sensors 70,90 can be adapted to detect a core mark including magnetized particles.

Various fiber optic cable components, other than armor tape 17, can be disposed in the annuli between jackets on which marks M,N,O and P are applied, for example: tight buffered optical fibers or bundles; filler rods; stranded strength elements; wire mesh; waterblocking members; tapes; yarns; strength yarns; ripcords; and/or electrical conductors, e.g., of the coaxial or twisted pair type. Armor tape 17 can include an overlap seam with a plastic tape thereover to prevent jacket zippering. The foregoing cable components can be applied to the core with conventional devices known to skilled artisans. Additionally, cables of the present invention can include a slotted rod core, and can include third pass jackets or more. The present inventions can be adapted for use in the manufacture of aerial cables, such as described in U.S. Ser. No. 09/002,158, incorporated by reference herein. Print head 65 can be replaced by a suitable ink jet printer as disclosed in U.S. Pat. No. 5,729,966, an offset printer, or a laser marking device as disclosed in U.S. Ser. No. 09/162,309, incorporated by reference herein.

Accordingly, what is claimed is:

1. A mark sensor for detecting a core mark disposed on a fiber optic cable core, comprising: a core receiving area for receiving said fiber optic cable core; and at least two sensors, said at least two sensors being disposed about said core receiving area, said at least two sensors being directed generally toward a common longitudinal axis of said core so that the sensing energy of said at least two sensors focuses on said common longitudinal axis of said core for observing a portion of the core for detecting said core mark.

2. The mark sensor of claim 1, including a sensor positioning system for moving said sensors relative to said core receiving area.

3. The mark sensor of claim 2, said sensor positioning system being operative to move said sensors upon insertion of said cable core in said core receiving area.

4. The mark sensor of claim 2, said sensor positioning system including a linkage to another mark sensor for transmitting said sensor motion to said other mark sensor.

5. The mark sensor of claim 2, said sensor positioning system permitting movement of said sensors generally in unison.

6. The mark sensor of claim 1, at least one sensor including a part for engaging said cable core.

7. The mark sensor of claim 1, at least one of said sensors being biased toward said core receiving area by a biasing member.

8. The mark sensor of claim 1, at least one of said sensors being mounted to a sensor unit that is moveable relative to said cable receiving area.

9. The mark sensor of claim 8, said movable sensor unit being operatively associated with parts that are operative to cause at least one adjacent sensor to move.

10. The mark sensor of claim 1, one of said sensors comprising an emitter/receiver.

11. The mark sensor of claim 1, one of said sensors comprising a bar code reader.

12. The mark sensor of claim 1, said sensors being mounted to a frame having stationary supports.

13. A mark sensor apparatus for detecting a mark disposed anywhere in or on a fiber optic cable, comprising:
   a receiving area for receiving said at least a portion of a fiber optic cable; and
   at least one sensor, said at least one sensor being disposed adjacent said receiving area for observing said cable portion for detecting said mark;
   a sensor positioning system, said sensor positioning system axially locating the cable and dynamically adjusting the position of said sensor relative to said receiving area.

14. The mark sensor of claim 13, said sensor positioning system being operative to move said at least one sensor upon insertion of said cable portion in said receiving area.

15. The mark sensor of claim 14, said sensor positioning system including a linkage to another mark sensor for transmitting sensor motion to said other mark sensor apparatus.

16. The mark sensor of claim 14, said sensor positioning system permitting movement of said at least one sensor generally in unison with another sensor mounted to said mark sensor apparatus.

17. The mark sensor of claim 13, said at least one sensor being part of a sensor unit having a positioning part for positioning said sensor relative to said cable portion.

18. The mark sensor of claim 17, said positioning part is operative to cause said at least one sensor to move.

19. The mark sensor of claim 13, a biasing member biasing said at least one sensor toward said receiving area.

20. The mark sensor of claim 13, said sensor being mounted to a moveable sensor unit that is moveable towards and away from said receiving area.

21. The mark sensor of claim 20, said movable sensor unit being operatively associated with at least one adjacent sensor unit so that when said moveable sensor unit moves said adjacent sensor is moved.

22. A mark sensor for detecting a mark disposed on a portion of a fiber optic cable, comprising:
   a core receiving area for receiving said fiber optic cable portion; and at least two sensors, said at least two sensors being disposed about said core receiving area and mounted at an angular spacing with respect to said core, said at least two sensors being directed generally toward a common longitudinal axis of said core so that electromagnetic energy of said at least two sensors focuses on said common longitudinal axis of said core for observing a surface of the cable portion for detecting said mark with electro-magnetic energy sweeping across a surface of said cable portion.

23. The mark sensor of claim 22, at least one of said sensors comprising a bar code reader.

24. The mark sensor of claim 22, at least one of said sensors being mounted to a frame.

25. The mark sensor of claim 22, said frame including a series of supports having respective said sensors mounted thereto.

26. A mark sensor for detecting a core mark disposed on a fiber optic cable core, comprising:

a core receiving area for receiving said fiber optic cable core; sensors, said sensors being disposed about said core receiving area for observing a portion of the core for detecting said core mark; and a sensor positioning system for moving said sensors relative to said core receiving area, said sensor positioning system including a linkage to another sensor for transmitting said sensor motion to said other sensor.

27. A mark sensor for detecting a core mark disposed on a fiber optic cable core, comprising:

a core receiving area for receiving said fiber optic cable core; and sensors, said sensors being disposed about said core receiving area for observing a portion of the core for detecting said core mark, at least one of said sensors comprising an emitter/receiver.

* * * * *